(No Model.) 3 Sheets—Sheet 1.

J. ZIMMERMAN & E. BARRATH.
MEAT CUTTING MACHINE.

No. 431,638. Patented July 8, 1890.

Attest
J. W. Figiurr
Alfred M. Allen

Inventors
John Zimmerman
Edw. Barrath

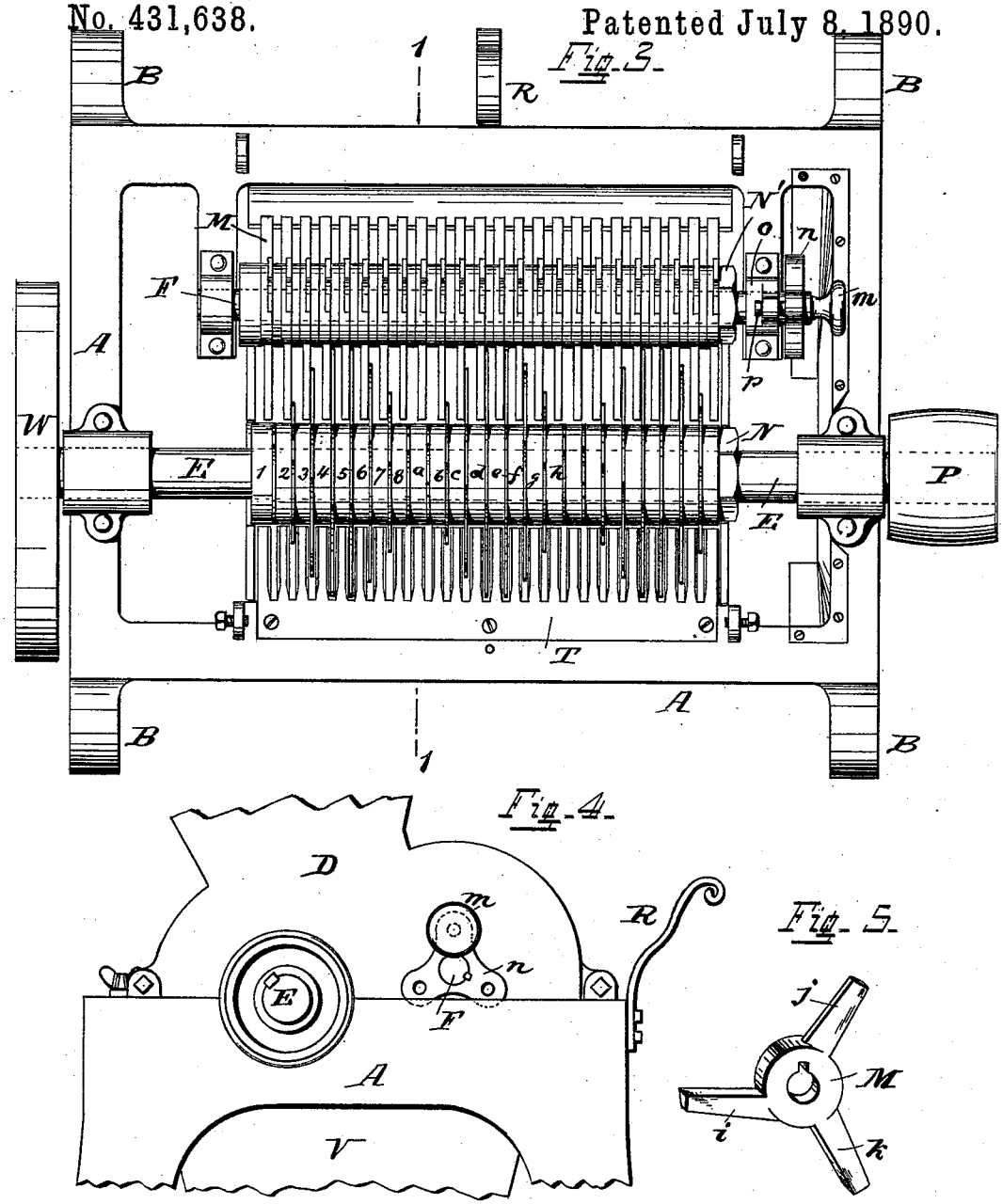

(No Model.) 3 Sheets—Sheet 3.

J. ZIMMERMAN & E. BARRATH.
MEAT CUTTING MACHINE.

No. 431,638. Patented July 8, 1890.

Attest
Inventors

UNITED STATES PATENT OFFICE.

JOHN ZIMMERMAN AND EDWARD BARRATH, OF CINCINNATI, OHIO, ASSIGNORS TO THE ZIMMERMAN MACHINE COMPANY, OF SAME PLACE.

MEAT-CUTTING MACHINE.

SPECIFICATION forming part of Letters Patent No. 431,638, dated July 8, 1890.

Application filed July 22, 1889. Serial No. 318,212. (No model.)

*To all whom it may concern:*

Be it known that we, JOHN ZIMMERMAN and EDWARD BARRATH, citizens of the United States, residing at Cincinnati, in the county of Hamilton and State of Ohio, have invented a certain new and useful Improvement in Meat-Cutting Machines, of which the following is a full, clear, and exact description, reference being had to the accompanying drawings, forming part of this specification.

Our invention relates to that class of meat-cutters in which a series of knives are radially fixed upon a revolving shaft and arranged to rotate between the edges of a series of stationary teeth fixed at one side of the knife-shaft to form a comb, the meat being fed down upon the stationary teeth within the action of the knives and being cut by the knives as they pass between the teeth of the comb.

Figure 1:
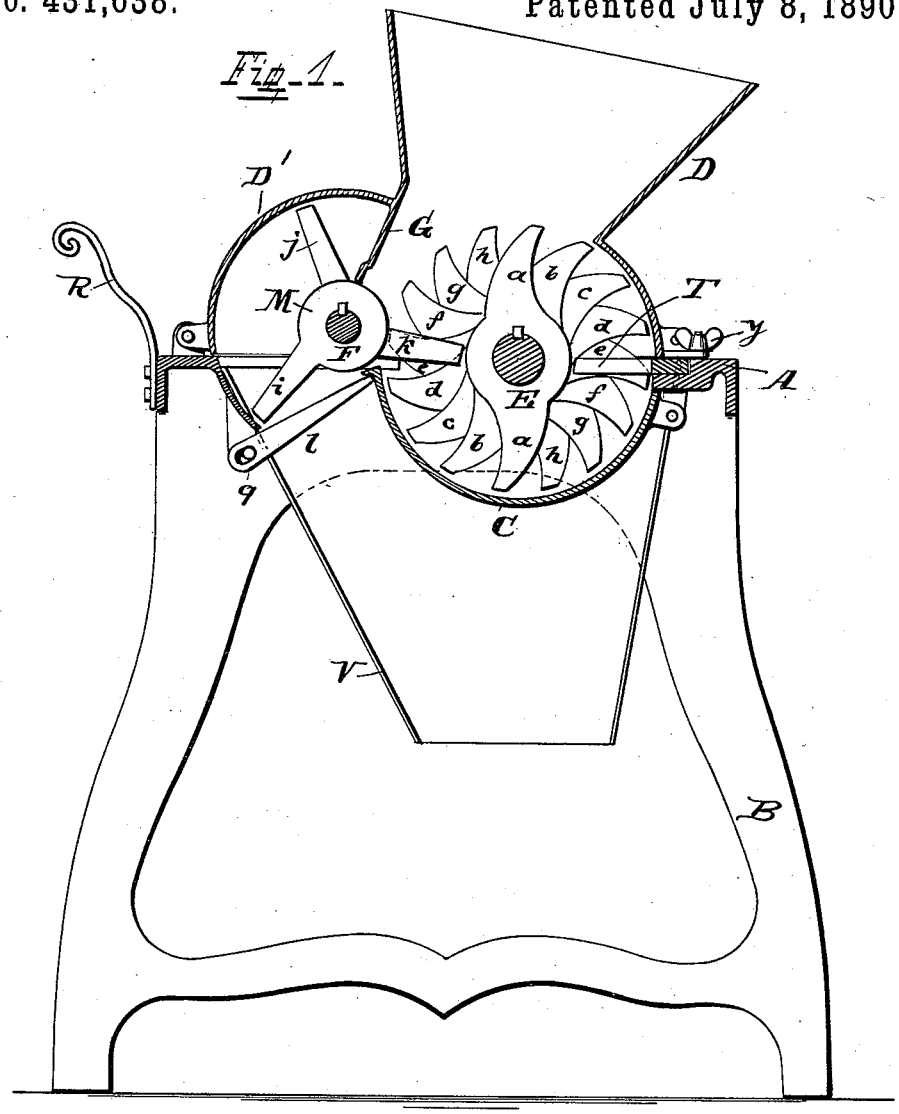
Figure 2:
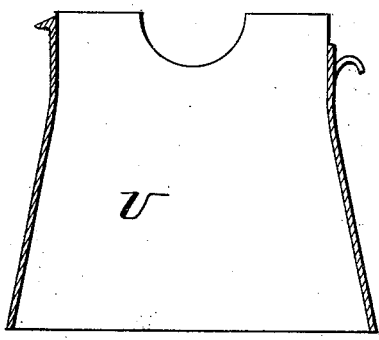
Figure 6:
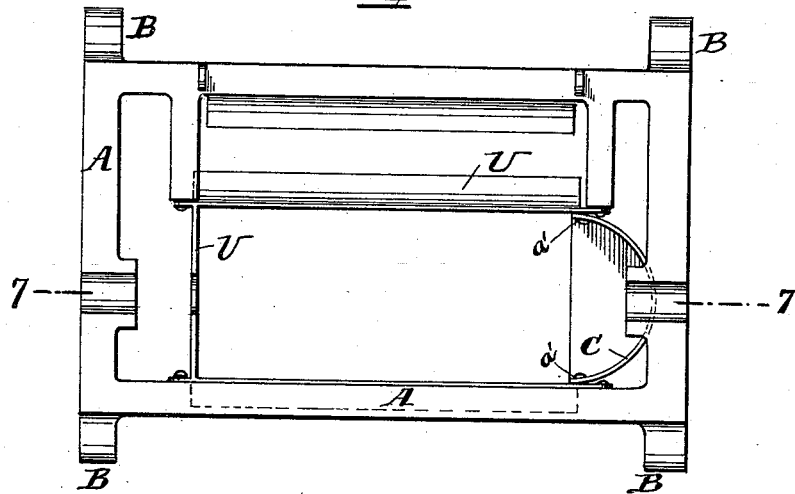

In the drawings, Figure 1 is a cross-section of the machine, taken in line 11 in Fig. 3. Fig. 2 is a cross-section of a modified form of the meat-trough with open bottom. Fig. 3 is a top plan view of the machine with the hopper and top covers removed. Fig. 4 is an end view of the upper portion of the machine; Fig. 5, a view in perspective of one of the three-armed disks or collars which make up the comb; Fig. 6, a top plan view of the frame of the machine with knife and comb shafts removed, showing our two forms of trough fastened together; and Fig. 7, a longitudinal section of Fig. 6, taken on the lines 7 7.

A is the cast-iron frame of the machine, rectangular in shape, of suitable size for the working parts, and is supported by the legs B B. Journaled in each side of the top of this frame and extending longitudinally through the same is the knife-shaft E, operated from the engine by the band-pulley P, and having a fly-wheel W at its other end. Upon this shaft E the cutting-knives $a\ b\ c\ d$, &c., are arranged spirally, as shown in Fig. 1. These knives are slightly S-shaped with central portion enlarged, and the shaft passes through an opening in the center of each knife, each knife being securely keyed to the shaft.

Between each knife spacing-collars 1 2 3, &c., are placed, which both space the knives and act as washers to keep them firmly in place and in exact line. The first collar is forged or permanently fixed on the shaft, then an S-shaped knife is adjusted thereon, then a collar, then a second knife at a slight angle to the first, then another collar and another knife inclined still more, and so on alternating collars and knives, and arranging the knives spirally, as many as are required, and then a nut N is added to hold the entire series firmly in place. These knives having an enlarged central hub are very much stronger and more durable than those ordinarily used in rotary cutters of this kind. Ordinarily knives of this kind, instead of being made double, are made single, with a shank fitting into the knife-shaft, and consequently the knife is weakest where the blade joins the shank, just where the greatest strain is on the knife when in use. In our improved form of knife, the knife being double and having a hub-center, the point of greatest strain is very strong.

Parallel with the shaft E and in the same horizontal plane, and having its bearings in inward projections of the frame-work A, is the shaft F. Along this shaft F a series of collars or disks M, having arms $i\ j\ k$, are adjusted, like the knives on the shaft E. The shaft F passes through the centers of these disks, which are securely keyed to it, and each disk has three arms of different thickness, each arm having a beveled or hollowed edge. One of the arms or teeth is about as thick as the central disk, another about half as thick, and the third intermediate between the two, while all the disks or collars of the series are counterparts of each other. These disks are arranged on the shaft F, with spacing-collars between each disk, in the same manner as the knives are adjusted on the knife-shaft, the first collar being forged or permanently fixed on the shaft for the rest of the series to rest against, except that instead of being arranged spirally the disks are so arranged that all the arms of the same thickness shall lie in the same plane, and thus three metallic combs are formed, each comb having a different space between its teeth, due to the difference in thickness of the three sets of teeth or arms. A nut or plate N' holds the series in place. Of course it will be understood that these disks may be provided with more than three arms, so that more than three grades of combs may be used, if desired.

Keyed to one end of the shaft F is the equilateral and triangular shaped plate n, having a hole in each projection. This plate n is keyed in such a position to the shaft that when one of its projections is at its highest point one set of teeth forming a comb shall extend out horizontally toward the knife-shaft. A pin p, with head m, is then passed through the upper hole in n and into or through a corresponding hole in a stationary-mounted lug O, and thus the comb is securely locked in position. The shaft F, with its mounted disks, is so adjusted in relation to the knives on the shaft E that each knife as it rotates will pass with a downward shearing cut in close proximity to the raised-edge side of each tooth on the disk-shaft, so that a clean cut is made. When it is desired to make a different grade of cut, the pin p is removed and the shaft F is turned forward to present another set of teeth adjusted for a comb. The front or right sides of the teeth of each comb are straight and the top surface raised on this side so as to form a cutting-edge, the opposite side being beveled downward, so as to leave a wider space for clearing below, and the knives are made with one side only beveled, the side next the tooth being flat, and the knives being curved upward, as they rotate a long sweeping and shearing cut is made the length of the tooth, which not only cuts the fibers of the meat, but tends to push back out of the way any hard substance in the meat which they cannot cut.

In meat-cutters of this class as hitherto made when it is desired to change the character of the cut it has always been necessary to remove one comb entirely and substitute another with coarser teeth; but with our improved device this is unnecessary. The three different sizes of combs are arranged on one shaft, and each comb can be rotated into position and locked there whenever required.

Another great advantage of our improved comb is that if any of the teeth should get broken while in use it is not necessary to throw away the whole comb, as is the case in machines as ordinarily constructed; but the single section injured alone can be replaced.

Another advantage is the great strength of our combs as here constructed. The teeth of each comb are here solid with the central hub, and thus the greatest strength is obtained at the base, where it is most needed, while in the ordinary metallic comb the weakest point is where the teeth join the cross-bar or back of the comb, as such combs are necessarily made by the milling process. A clearing-comb T is secured to the opposite side of the frame, so that the knives pass upward between its teeth, and thus the knives are freed from the pieces of meat which may adhere to them. This comb T also acts as a cover to prevent the meat being thrown upward out of the receiving-trough. This trough C, semi-cylindrical in shape, is placed underneath the knives, so that the ends of the knives will pass close to its internal surface. This trough is hinged to one side of the frame A, and is supported in place by the lever or pin 1, pivoted at 9, the trough being supported by the bracing action of the pin against the projection at the external edge of the trough at v. This trough is closed at one end; at the other it is open for the discharge of the meat when cut up. The spiral arrangement of the knives with one side only beveled serves not only to mix and cut up the meat, but to feed it along gradually to the open end of the trough. At that end a shield or guide-board V turns the minced meat into a receptacle placed below.

Above the revolving knife-shaft is the hopper D, hinged to one side of the machine. This hopper has a semicircular addition D' to serve as a cover for the combs not in use, and a partition G divides the interior of the hopper proper from these combs, forming a back wall, to prevent the meat from being thrown by the action of the knives and packed around the unused combs.

R is an arm fixed to the side of the frame, upon which the hopper can rest when it is swung back, and the thumb-screw y is used to fasten down the hopper when in use.

In Fig. 2 is shown a cross-section of an open box or chute U, which can be used in place of the trough C when desired. This is hung to one side of the frame, and is supported in the same way as the trough C, and serves to guide the meat directly into a receptacle placed below.

Figure 7:
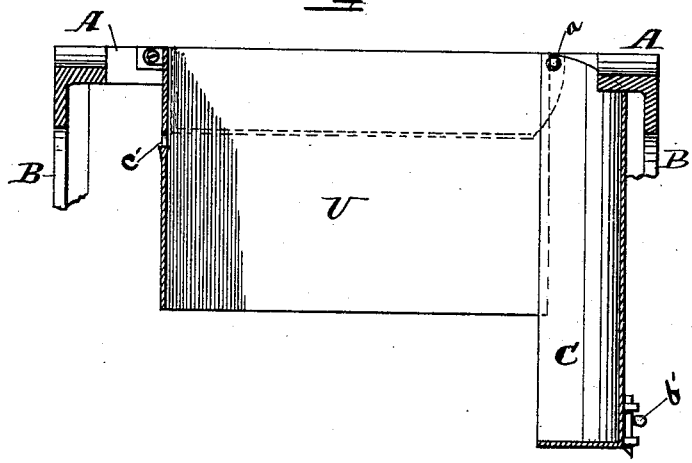

In Figs. 6 and 7 we show our two kinds of meat-troughs fastened together, so that it is not necessary to remove our open trough U when it is desired to use the semi-cylindrical trough. In this modified form the trough C is supported inside of the trough U, so that both troughs are always ready for use, one end of the open trough U being removed and the cylindrical trough C taking its place. The trough C is pivoted at its open end at a' a' inside the trough U, also at its open end, and when it is desired to use trough C it is swung up into position, as shown by the dotted lines, Fig. 7, and held in place by the catch b', which catches in an opening c' in the closed end of the box U.

Having thus fully described our invention, what we claim, and desire to secure by Letters Patent, is—

1. In a meat-cutter, a series of similar disks arranged on a shaft, each disk provided with two or more arms of different thickness, arms of the same thickness being arranged in line to form an equal number of combs graded in size, in combination with a series of cutting-knives, substantially as shown and described.

2. In a meat-cutter, the combination, with a series of cutting-knives, of a series of similar disks arranged on a shaft, each disk having a number of radially-extending arms beveled to form a cutting-edge, each series of disk-arms being different in thickness from that of the other series, the whole arranged so that all arms of equal thickness are in parallel lines, thus forming a series of combs of different grades, substantially as shown and described.

3. In a meat-cutter, the combination, with a knife-shaft bearing a series of spirally-arranged knives, of a comb-shaft bearing a similar series of radiate disks with arms of unequal thickness, similar arms arranged in parallel lines so as to form a series of radiate combs, substantially as and for the purpose described.

4. In a meat-cutter, a series of collars or disks with arms of unequal thickness, arms of same thickness being placed in parallel lines on a shaft, a fixed collar at one end of said shaft, and a nut at the other end to hold said disks in place, in combination with an equilateral plate or disks on said shaft, stationary lug $o$, having perforations $p$, and a holding-pin to fasten said plate, substantially as shown and described.

5. In a meat-cutter, the combination of a series of arm-collars fixed on a shaft with arms arranged in parallel lines to form combs, the arms of each comb being of unequal thickness, spacing-collars fixed on the shaft between each arm-collar, the key or lock disk fastened on the comb-shaft on the opposite end from the fixed collar, a locking device consisting of a plate or disk with holes corresponding in number to the combs on the shaft, and a mounted stationary lug provided with a hole to correspond with the holes in the lock-disk to be held together by the pin or screw passing through said hole, substantially as and for the purpose described.

6. In a meat-cutter, the combination, with the knife-shaft and series of S-shaped knives spirally arranged thereon, of a comb-shaft parallel thereto carrying a series of radially-disposed combs, and a hinged hopper having a back partition to separate the knife-compartment from the unused combs, substantially as and for the purpose described.

7. In a rotary meat-cutter, the combination, with the cutting-knives, of a semi-cylindrical trough, open at one end and closed at the other said trough being hinged and adapted to be swung to one side and having a projection on its upper external edge to receive a supporting-pin pivoted loosely to the frame, substantially as shown and described.

JOHN ZIMMERMAN.
EDW. BARRATH.

Witnesses:
C. W. FIGUER,
ALFRED M. ALLEN.